(12) United States Patent
Tarpill

(10) Patent No.: US 6,467,171 B2  
(45) Date of Patent: Oct. 22, 2002

(54) COMPOUND COAXIAL CABLE STRIPPING TOOL

(75) Inventor: Andrew J. Tarpill, East Haddam, CT (US)

(73) Assignee: Capewell Components Company, LLC, Cromwell, CT (US)

( * ) Notice: Subject to any disclaimer, the term of this patent is extended or adjusted under 35 U.S.C. 154(b) by 0 days.

(21) Appl. No.: 09/802,831

(22) Filed: Mar. 9, 2001

(65) Prior Publication Data

US 2002/0124410 A1 Sep. 12, 2002

(51) Int. Cl.[7] .................................................. H02G 1/12
(52) U.S. Cl. ........................ 30/90.2; 30/90.1; 30/91.2; 81/9.4
(58) Field of Search ............................... 30/90.1, 90.2, 30/90.4, 90.6, 91.2; 81/9.4

(56) References Cited

U.S. PATENT DOCUMENTS

| | | | | |
|---|---|---|---|---|
| 3,620,104 A | * | 11/1971 | Horrocks ...................... | 30/90.1 |
| 3,659,483 A | * | 5/1972 | Matthews ...................... | 30/90.1 |
| 3,820,420 A | | 6/1974 | Matthews ...................... | 30/91.2 |
| 4,379,665 A | | 4/1983 | Hendershot et al. ......... | 30/90.1 |
| 4,559,704 A | | 12/1985 | Michael, III .................. | 30/90.1 |
| 4,594,029 A | | 6/1986 | Michael, III .................. | 30/90.1 |
| 4,730,391 A | | 3/1988 | Wood ........................... | 30/90.1 |
| 4,731,928 A | | 3/1988 | Jackson ....................... | 30/90.2 |
| D297,910 S | | 10/1988 | Mathews | |
| 4,785,535 A | | 11/1988 | Nespor ......................... | 30/90.1 |
| 4,987,801 A | | 1/1991 | Brown ......................... | 81/9.4 |
| 5,050,302 A | * | 9/1991 | Mills ........................... | 30/90.4 |
| 5,561,903 A | | 10/1996 | Bourbeau .................... | 30/90.4 |
| 5,713,132 A | | 2/1998 | Tarpill ......................... | 30/91.2 |
| 5,822,863 A | * | 10/1998 | Ott ............................... | 30/90.4 |
| 5,956,852 A | | 9/1999 | Tarpill ......................... | 30/90.3 |
| 6,067,715 A | | 5/2000 | Hollingsworth ............. | 30/90.4 |
| 6,128,976 A | | 10/2000 | Tarpill ......................... | 81/9.44 |

OTHER PUBLICATIONS

Model DST Cable Stripping Tool Operating Instructions and picture.
Model SLT Cable Stripping Tool picture.

* cited by examiner

Primary Examiner—Hwei-Siu Payer
(74) Attorney, Agent, or Firm—DeLio & Peterson, LLC

(57) ABSTRACT

A tool for removing insulation from coaxial cable includes a fixed double-edged cutting blade mounted on the tool body and a planar cutting blade that is mounted on a cassette to move perpendicular to the axis of the cable between a cutting position and a non-cutting position. The double-edged cutting blade includes a transverse cutting edge and a longitudinal cutting edge, the transverse cutting edge lying in a plane substantially perpendicular to an axis of the cable and the longitudinal cutting edge lying in a plane substantially parallel to the axis of the cable. The planar cutting blade has a cutting edge lying in a plane substantially perpendicular to the axis of the cable. The blades may be mounted on the same end of the tool, requiring that the coaxial cable be inserted only once into the tool, or on opposite ends of the tool.

20 Claims, 2 Drawing Sheets

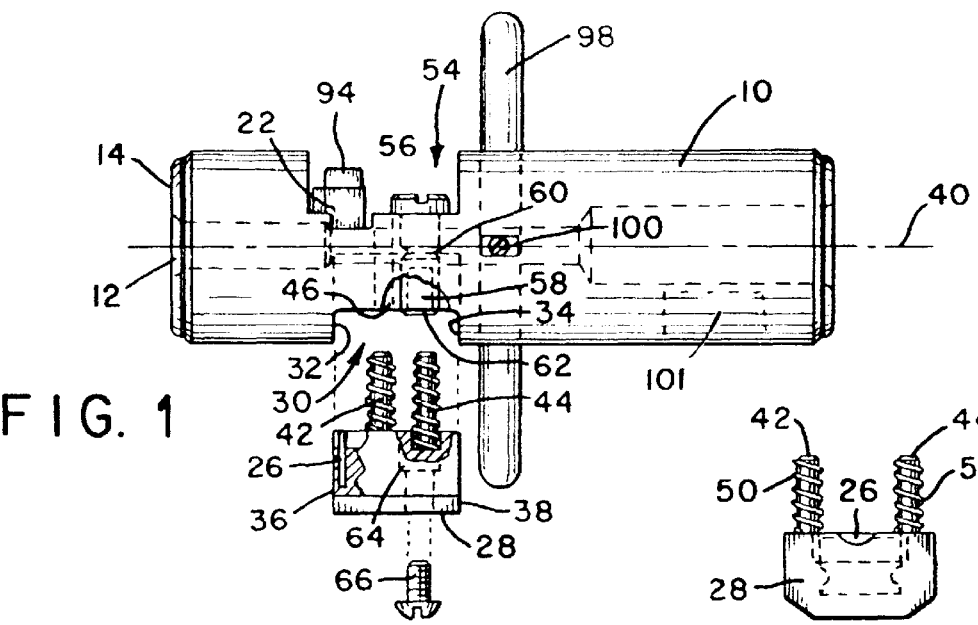
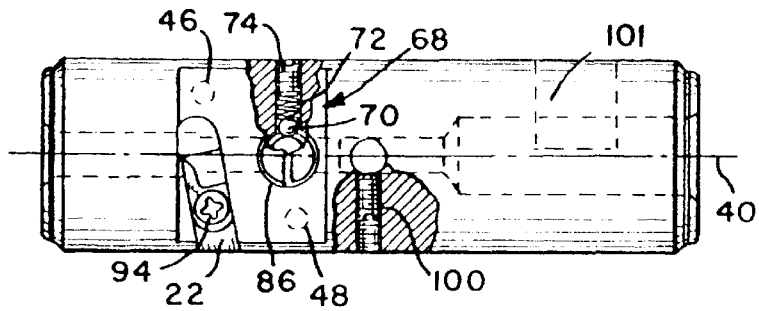
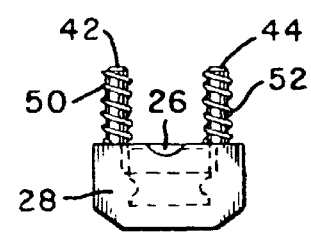
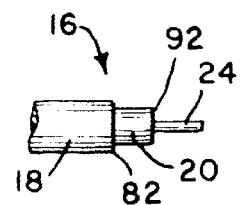
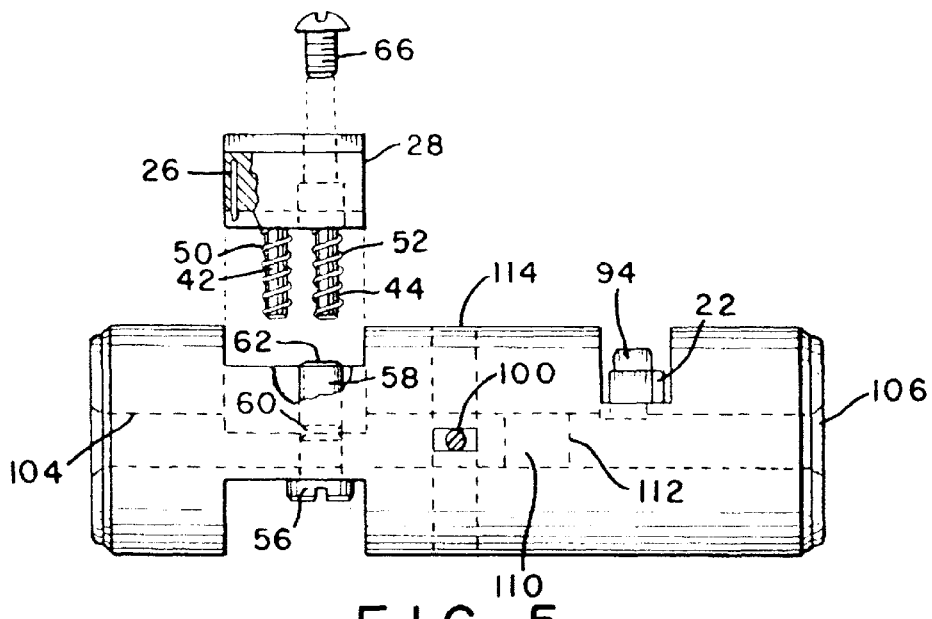

COMPOUND COAXIAL CABLE STRIPPING TOOL

BACKGROUND OF THE INVENTION

1. Field of the Invention

The present invention relates to stripping tools for removing insulation from coaxial cables prior to the attachment of an electrical connector.

2. Description of Related Art

Coaxial cables are widely used to distribute many different kinds of signals, such as video and data signals, and come in a wide variety of designs and sizes. The most common type of coaxial cable includes a center conductor surrounded by an inner layer of insulation and an outer conductor protected with an outer plastic jacket.

However, there are many different cable designs and many different types of materials that may be used for the conductors, the insulation and the jacket. The center conductor is most often a solid wire conductor, such as copper or aluminum. However, the outer conductor may be a wire braid, a metallic foil or a metallized tape such as a mylar or other metallized plastic film. The outer conductor may also be constructed with up to four or more different layers in various combinations of braided wire, metallic foil, metallized plastic or other conductive tape material. There may also be various layers of separating material or adhesives used to bond layers together.

Some combinations of these materials result in a cable that is difficult for a conventional stripping tool to prepare for the attachment of an electrical connector. The particular type of cable must be prepared to match the requirements of the selected type of connector. Typically, cable preparation involves removing sections of the insulation and jacket to expose the inner and outer conductors and produce a "stepped" cable end. The jacket, outer conductor and insulation are usually removed for a first predetermined distance to expose the inner conductor and the jacket is removed for a second predetermined distance to expose the outer conductor. The first and second predetermined distances depend on the particular type of connector to be attached.

Coaxial cable stripping tools are specifically designed for particular cables and for particular types of connectors to remove the desired amount of cable material efficiently and accurately, without damaging the inner and outer conductors. In most handheld stripping tool designs the cable will be inserted into an opening in the tool, or jaws will be closed around the cable, to position one or more cutting blades relative to the cable. The tool will then be rotated around the cable to make the necessary cuts.

One type of handheld stripping tool uses a double-edged cutting blade of the type shown in U.S. Pat. No. 3,820,420 to spirally remove material from the exterior of the cable as the tool is rotated. U.S. Pat. Nos. 5,956,852 and D297,910 show handheld coaxial cable stripping tools of this type. The tool includes an axial opening to receive the cable. One or more double-edged cutting blades extend into this opening to remove material as the cable is rotated and supported by the interior walls of the opening. Each double-edged blade includes a longitudinal cutting edge that removes material to reduce the cable diameter thereby exposing the cable interior and a transverse cutting edge that cuts approximately perpendicular to the longitudinal cutting edge to release the excess material from the adjacent exterior layer.

Double-edged cutting blades are particularly effective for larger cables where the spiral cutting action removes a small ribbon of waste material as the tool is turned. Blades of this type also work well for any cable where the outer layer of material being removed has good cylindrical rigidity so that the transverse cutting edge can cut through it as the tool is rotated. However, in some cables, such as cables having an open braided shield or a thin foil forming the outer conductor, the transverse cutting edge may crumple the foil or fail to cut all of the braid leaving a ragged transverse edge along the cut. It is particularly difficult to cut cleanly through multiple layers of thin shielding material.

Nonetheless, the double-edged cutting blade is very desirable for stripping some cables for the attachment of particular types of electrical connectors. The longitudinal cutting edge of the blade lies at the intersection of two surfaces forming a wedge that terminates in the longitudinal cutting edge. As the tool is rotated, this wedge lifts the material being removed away from the underlying material as the transverse cutting edge severs it. This lifting action protects any underlying conductive material from being nicked or damaged. The lifting action also tends to slightly separate the adjacent overlying material from the underlying material at the point where the transverse edge is cutting.

For proper connection to the coaxial cable being prepared, some electrical connectors must slide under the outer jacket or between layers of the cable. When a double-edged blade is used, the separation between the inner layer and the outer layer at the edge of the cut, provided by the described lifting action, facilitates the entry of the connector between the inner and outer concentric layers. In cables of this type, the longitudinal cutting edge, although termed a "cutting edge" need not actually make a severing cut, and instead serves primarily to separate layers and lift the material to be removed into position to be cut by the transverse cutting edge.

Throughout the description that follows, a blade of the type described above and in U.S. Pat. No. 3,820,420 will be referred to as a "double-edged cutting blade" even where the longitudinal edge performs only the function of separating an outer layer from an inner layer along a preexisting cylindrical shear surface between coaxial layers of the cable.

Another type of handheld stripping tool uses one or more thin planar cutting blades similar to razor blades. U.S. Pat. No. 5,713,132 shows a handheld coaxial cable stripping tool of this type. The blades are mounted on jaws that close around the cable and hold the planar blades perpendicular to the axis of the cable. Designs of his type work well on cables where the outer conductor does not have good cylindrical rigidity because the cutting force from the planar blade is oriented radially inward, instead of circumferentially as is the case with the transverse cutting edge of a double-edged blade. In the planar blade design, the jacket, outer conductor and all other material to be removed are supported against the inward cutting force of the planar blade by the underlying core of the cable.

Another advantage of the planar blade is that it is much thinner than the transverse cutting edge of a double-edged blade. This reduces the chance of tearing, crumpling or incompletely cutting the outer conductor. The planar blade extends into near-tangential contact to the inner layer being exposed. This produces a very sharp corner at the junction between the exposed inner material and the remaining outer material.

However, tools designed with planar cutting blades are not desirable for all types of cables. There is some risk of nicking the conductor below the blade if the cable is not round. The sharp corner produced between the material being removed and the material remaining is not desirable in some applications where the connector or another preparation tool must slide underneath the remaining outer material. As described above, in these applications a double-edged cutting blade produces a better cut because it lifts the outer layer slightly and spreads the remaining outer material outward in a slight bell shape at the plane of the cut.

Tools with planar cutting blades can only be used with cables where a cylindrical shear surface already exists within the cable at the desired depth so that it is only necessary to make the transverse cut. After the transverse cut is made, the outer cylinder of excess material must slide off the end of the cable, separating from the inner core being exposed along the pre-existing cylindrical shear surface.

Larger cables may have too much friction between the waste material to be removed and the inner core. The friction prevents the waste material from being removed, even if an appropriate shear surface exists. Other cables, may be too rough at the shear surface, or will need the cutting action of the longitudinal cutting edge to separate the outer material being removed from the underlying layer.

Some coaxial cables have combinations of materials and designs that make them difficult to strip with either type of tool described above.

Bearing in mind the problems and deficiencies of the prior art, it is therefore an object of the present invention to provide a coaxial cable stripping tool that may be used to remove insulation from coaxial cables that are difficult to strip with conventional stripping tools.

Another object of the present invention is to provide a coaxial cable stripping tool that provides the advantages of both a double-edged type of stripping tool and a planar blade type of tool.

Still other objects and advantages of the invention will in part be obvious and will in part be apparent from the specification.

SUMMARY OF THE INVENTION

The above and other objects, which will be apparent to those skilled in art, are achieved in the present invention, which is directed to a tool for stripping insulation from coaxial cables. The tool includes a tool body, a double-edged cutting blade and a planar cutting blade.

The double-edged cutting blade is mounted on the tool body and includes a transverse cutting edge and a longitudinal cutting edge. The transverse cutting edge lies in a plane substantially perpendicular to an axis of the cable and the longitudinal cutting edge lies in a plane substantially parallel to the axis of the cable. As the tool is rotated relative to the cable, the double-edged cutting blade makes a helical cut and removes waste material from the outside diameter of the cable. The helical cut continues until the cable reaches a stop in the tool.

The planar cutting blade is mounted for motion relative to the tool body transversely to the axis of the cable between a cutting position and a non-cutting position. The planar cutting blade has a cutting edge that lies in a plane substantially perpendicular to the axis of the cable.

In the preferred embodiment of the invention, the planar cutting blade is mounted on a blade cassette that moves perpendicular to the axis of the cable from the cutting position to the non-cutting position. As the tool is rotated relative to the cable, with the planar cutting blade in the cutting position, it cuts down to a preset depth in the cable, typically to the inner conductor. The blade cassette can then be moved to the non-cutting position, the cable removed and the waste material can then be pulled off.

The tool body includes a notch that receives the blade cassette and supports it during cutting. The notch has opposed parallel sides that cooperate with opposed face surfaces on the blade cassette. The blade cassette face surfaces are slidingly guided between the opposed parallel sides of the notch as the cassette moves between the cutting and non-cutting positions.

The coaxial cable stripping tool also includes a guide mechanism for guiding the blade cassette during movement from the non-cutting position to the cutting position. The guide mechanism includes at least one guide rod, and preferably two guide rods, mounted to the tool body. The tool body includes corresponding guide bores receiving the guide rods. The cassette is preferably biased outwards to the non-cutting position by one or more springs. The springs may be mounted on the guide rods.

In another aspect of the invention, the tool also includes a positioning member connected to the cassette and extending through the tool body to an opposite side of the tool body from the cassette. The positioning member also may assist in guiding the motion of the cassette, but principally acts to hold the cassette during cutting so that the planar blade remains in the desired cutting position.

The positioning member is operable from the opposite side of the tool body from the cassette to move the cassette into the non-cutting position. In the design shown, the positioning member includes a barrel bolt having an enlarged head that acts as a stop to stop motion of the blade cassette at the non-cutting position. The positioning member cooperates with a spring detent mechanism to position the blade cassette in the cutting position and accurately hold the blade cassette in the cutting position as the tool is rotated to make the cut with the planar blade.

The detent mechanism preferably comprises a spring and ball detent mechanism cooperating with a detent notch formed in the barrel bolt.

In another aspect of the invention, the blade cassette and planar blade form an integral replaceable unit. The blade cassette may be formed of molded plastic, with the planar blade being positioned during the molding operation and held in the desired position relative to the blade cassette by the molded plastic.

In one embodiment of the tool, the tool body includes first and second opposed ends having corresponding first and second opposed openings for receiving the coaxial cable. The planar blade is mounted in operable position relative to the first end of the tool body and extends into the first opening when the planar blade is in the cutting position. The double-edged cutting blade is mounted in operable position relative to the second end of the tool body and extends into the second opening. In this embodiment, the planar blade makes a stripping cut when the tool is rotated while the coaxial cable is inserted into the first opening and the double-edged cutting blade makes a stripping cut when the tool is rotated while the coaxial cable is inserted into the second opening.

In an alternative embodiment of the tool, the tool body includes first and second opposed ends, the first end having a first opening therein. The planar blade is mounted in operable position relative to the first end of the tool body and extends into the first opening when the planar blade is in the cutting position. The double-edged cutting blade is also mounted in operable position relative to the first end of the tool body and also extends into the first opening. In this design, both blades are mounted near the same end and the opposite end is available for another use.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a left side elevational view of the coaxial cable stripping tool of the present invention, a portion of the tool including the blade cassette and the planar blade being shown separated from the body of the tool for clarity.

FIG. 2 is a top elevational view of the coaxial cable stripping tool seen in FIG. 1.

FIG. 3 is a front elevational view of the integral blade cassette and planar blade shown separated from the tool body in the side elevational view of FIG. 1.

FIG. 4 is a top elevational view of a typical coaxial cable after it has been stripped by the stripping tool of this invention.

FIG. 5 is a left side elevational view of an alternative embodiment of the coaxial cable stripping tool of the present invention in which the double-edged blade and the planar blade have been mounted at opposite ends of the tool.

DESCRIPTION OF THE PREFERRED EMBODIMENT(S)

Figure 6:
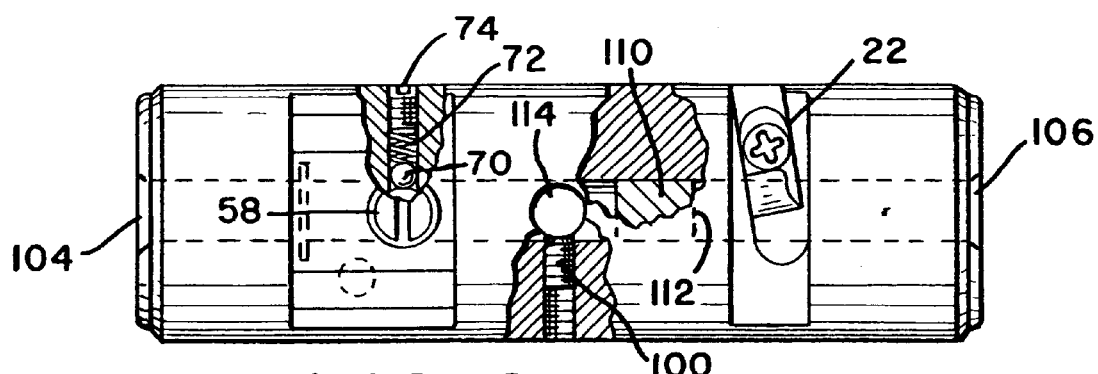
FIG. 6 is a top elevational view of the alternative embodiment coaxial cable stripping tool seen in FIG. 5.

In describing the preferred embodiment of the present invention, reference will be made herein to FIGS. 1–9 of the drawings in which like numerals refer to like features of the invention.

Referring to FIG. 1, the coaxial cable stripping tool of the present invention includes a cylindrical tool body 10 having an axial opening 12 in end 14 of the tool body. As can be seen in FIG. 4, which shows a completed stripping cut, the tool is designed to produce a stepped cut on coaxial cable 16. The coaxial cable includes an outer jacket 18 having an outside diameter just slightly smaller than the inside diameter of axial opening 12, allowing the cable to smoothly enter axial opening 12 where it is supported by the inner walls during cutting.

As the tool is rotated relative to the cable, outer conductor 20 is exposed by a double-edged cutting blade 22 (see FIG. 2), which removes only the outer jacket 18. The cut required to expose inner conductor 24 is made by a planar cutting blade 26 (see FIGS. 1 and 3), which cuts through the jacket 18, the outer conductor 20 and insulation 102.

Planar cutting blade 26 is mounted in a cassette 28 installed in a notch 30 in the tool body 10. Notch 30 includes opposed parallel sides 32 and 34 that cooperate with opposed face surfaces 36 and 38 on the cassette 28 to guide the cassette as it moves radially inward and outward relative to the axis 40 of the tool.

Cassette 28 includes a pair of guide rods 42, 44 that extend into corresponding guide bores 46 and 48 in the tool body. Guide rod springs 50 and 52 surround the guide rods 42 and 44 and urge the cassette 28 towards a non-cutting position away from the coaxial cable 16. It is also possible to reverse the guide rods and guide bores so that the rods are mounted in the body and the bores are in the cassette or to use fewer or more guide rods and bores or other known guiding mechanisms.

In the non-cutting position, blade 26 is clear of the axial bore 12 and the coaxial cable can be inserted or removed from the bore without contacting the blade. In the cutting position, the cutting edge on the planar blade 26 is approximately tangential to the center conductor 24.

The cassette 28 is held in the cutting position by a positioning member comprising a barrel bolt 54 that extends through the tool body 10 and cooperates with a detent mechanism 68 (see FIG. 2). The barrel bolt 54 includes an enlarged head 56, a barrel body 58 having a ring groove 60 about its center and a threaded opening 62 at the end opposite the head 56. The end of the barrel bolt 54 with threaded opening 62 extends into bore 64 in the cassette 28 and is held seated in the bottom of bore 64 by screw 66 which is threaded into opening 62.

As the cassette 28 slides between the cutting and non-cutting positions, positioning member 54 and the guide rods 42, 44 move with it. Detent mechanism 68 comprises a ball 70, a spring 72 and a setscrew 74. The spring 72 pushes the ball 70 into the ring groove 60 when the cassette 28 slides to the cutting position. This accurately holds the planar cutting blade 26 in the correct position with the planar cutting blade tangential to the inner conductor 24 as the tool is rotated.

Figure 9:
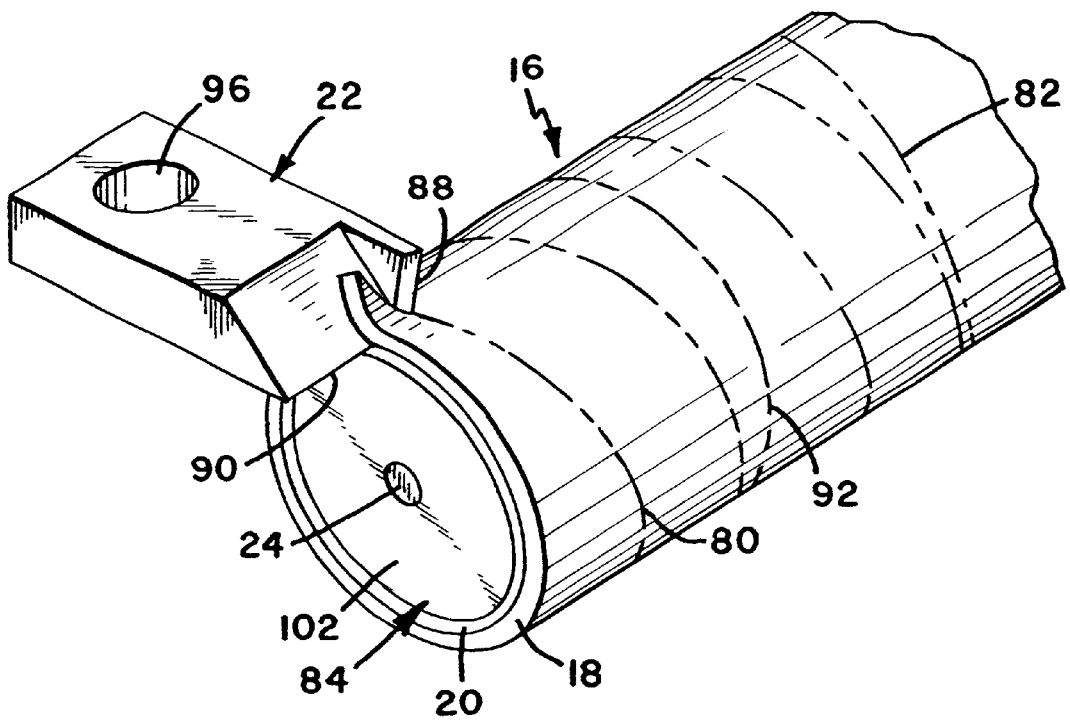
FIG. 9 is a perspective view from a reverse angle showing how the double-edged blade removes insulation from the coaxial cable in a helical cut.

FIG. 2 shows the mounting of the double-edged cutting blade 22. FIG. 9 generically shows how blade 22 cuts in a helical pattern 80 to remove the jacket material 18 back to plane 82. The helical cutting continues until the transverse cutting edge 88 reaches plane 82. At this point, the end 84 of the coaxial cable has just made contact with the barrel bolt 58 at point 86.

As soon as end 84 of the cable 16 reaches the barrel bolt, the inward motion of the cable is stopped, and the transverse cutting edge 88 of cutting blade 22 smoothly transitions into a circle at cutting plane 82. As can be seen in FIG. 9, the depth of cutting blade 22 is carefully adjusted so that longitudinal cutting edge 90 lies at the depth matching the transition between the jacket 18 and the outer conductor 20. This allows longitudinal cutting edge 90 to separate and lift the outer jacket 18 from the outer conductor layer 20 as it helically peels off a strip of jacket material back to plane 82.

Cutting plane 92 has also been indicated in FIG. 9 where the planar blade 26 will act to cut through the outer conductor 20 down to tangential contact with inner conductor 24.

As the coaxial cable 16 moves past the double-edged cutting blade 22, the cutting action reduces the diameter of the cable. To provide support for the cable, axial opening 12 has a correspondingly reduced diameter (see FIGS. 1 and 2) in the region between transverse cutting edge 88 and the barrel bolt 54. Cutting blade 22 is held in position with a screw 94 extending through opening 96 in the blade 22. The angle between blade 22 and the axis 40 of the coaxial cable (seen best in FIG. 2) sets the helical cutting angle.

To assist in rotating the tool, an optional transverse T-bar 98 is provided, which is locked in place with setscrew 100.

To use the tool, the operator presses down on enlarged head 56 of the barrel bolt to push the cassette 28 to the non-cutting position. This ensures that planar blade 26 is out of the path of the coaxial cable. Coaxial cable 16 having a square cut end is then inserted into opening 12. The tool is rotated around the axis 40 of the cable (using optional T-bar 98, if desired) and the double-edged cutting blade 22 makes helical cut 80 to expose the outer conductor 20 back to plane 82. The helical cut continues until the end 84 of the cable strikes the barrel bolt.

As soon as the double-edged cutting blade 22 has finished the cut, the helical waste material drops away. At this point, the planar cutting blade 26 is located at plane 92 relative to the cable. The tool operator then presses the cassette 28 into notch 30. This pushes planar cutting blade 26 through the outer conductor 20 and insulation 102 at plane 92 such that the cutting edge is approximately tangential to center conductor 24. Detent mechanism 68 holds the cassette 28 and cutting blade 26 in this position. As the operator rotates the tool, he need not be concerned that the cassette will back out away from the cable. As the tool is rotated, planar cutting blade 26 makes the cut at plane 92 and separates the waste material surrounding center conductor 24 from the adjacent material exposed by blade 22.

The operator then presses enlarged head 54 to move the cassette outward to the non-cutting position. The coaxial cable 26 is removed from axial opening 12. Waste material in the region between plane 92 and the end 84 of the cable is twisted off to produce the prepared cable having the final shape seen in FIG. 4.

As can be seen in FIGS. 1–4, the preferred embodiment of the tool positions both the planar cutting blade 26 and the double-edged cutting blade 22 near end 14 of the tool, but on opposite sides of axis 40. In this way, the tool operator only needs to insert the cable once. Upon removal of the cable from axial opening 12, both cuts have been completed.

Because only one end of the tool is used, the opposite end may be optionally used for another type of cable stripper or cable preparation device positioned at the location indicated with reference number 101 in FIGS. 1 and 2. The additional mechanism may be used to prepare a different type of cable, or for another stripping operation on the same cable.

FIGS. 5 and 6 show an alternative embodiment of the present invention. In this design, the double-edged cutting blade 22 is mounted at one end of the tool and the planar blade cassette are mounted at the opposite end. This configuration is desirable where the outer conductor 20 to be exposed is a loose or open braid or other material that may be disturbed by the planar cutting blade when making the cut at plane 92.

Figure 7:
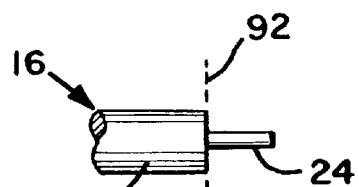
FIG. 7 is a top elevational view of an intermediate stage in stripping a typical coaxial cable after it has been stripped by the planar blade of the alternative embodiment coaxial cable stripping tool seen in FIGS. 5 and 6.
Figure 8:
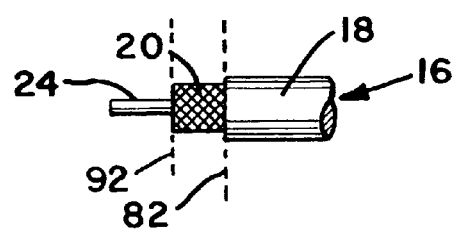
FIG. 8 is a top elevational view of the final stage in stripping the coaxial cable of FIG. 7.

More specifically, as can be seen in FIGS. 6, 7, and 8, the design of the alternative embodiment allows the cut along plane 92 to be made first while the jacket 18 is holding the outer conductor 20 in position. This prevents the planar cutting blade 26 from disturbing the outer jacket 18.

To use the tool shown in FIGS. 5 and 6 the coaxial cable is inserted first into axial opening 104 on the left end of the tool. The cassette 28 and planar cutting blade 26 are used in exactly the manner described previously to make the cut along plane 92 first. Unlike the embodiment shown in FIGS. 1 and 2, the cable does not pass by the double-edged cutting blade before the cut at plane 92 is made.

Pushing the cassette inwards to the cutting position and rotating the tool produces a cut along plane 92. The enlarged head 56 of the barrel bolt is then pressed to shift the cassette 28 to the non-cutting position and the cable is removed from axial opening 104. The waste material is then removed to produce the coaxial cable seen in FIG. 7.

This cable is then inserted into the opposite axial opening 106 on the opposite end of the tool. The double-edged cutting blade 22 is mounted at this end and operates exactly as described previously to remove the jacket material 18 back to plane 82. This exposes the braided conductor 20, producing the coaxial cable seen in FIG. 8.

In the design seen in FIGS. 5 and 6, the barrel bolt cannot act as a stop to limit the extent of the helical. Accordingly, a stop block 110 is positioned in axial opening 106. The end of the cable contacts surface 112 on stop block 110 to stop the helical cut at plane 82. The barrel bolt 54 acts as a stop with respect to planar cutting blade 26 in the manner previously described.

Optional T-bar handle 98 is not shown in connection with the embodiment of FIGS. 5 and 6, however an opening 114 is provided to receive the handle and setscrew 100 is provided to attach the handle, if desired.

It is also possible to design a third embodiment of the tool in which the cut by the double-edged cutting blade is made first and the cut by the planar blade is made second. This embodiment would be substantially similar to the embodiment seen in FIGS. 5 and 6 except that the diameter of axial opening 104 would be reduced to match the reduced diameter of the coaxial cable as a result of the removal of the jacket material 18.

In all of the disclosed designs, it would be preferred for the cassette to be constructed of a molded plastic. As can be seen in FIG. 3, the planar blade can be directly molded into the cassette such that the cassette can be replaced as a complete unit when the planar blade becomes dull. Alternatively, the planar blade may be removably attached to a recess molded into one of the face surfaces.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A tool for stripping insulation from a coaxial cable comprising:

a tool body;

a double-edged cutting blade, mounted on the tool body, for removing insulation surrounding an outer conductor of the coaxial cable, the double-edged cutting blade including a transverse cutting knife edge and a longitudinal cutting edge, the transverse cutting knife edge lying in a plane substantially perpendicular to an axis of the cable for making a cut in a first cutting plane substantially perpendicular to the axis of the cable to expose the outer conductor of the cable and the longitudinal cutting edge lying in a plane substantially parallel to the axis of the cable for separating the insulation from the outer conductor of the cable; and a planar cutting blade mounted for motion relative to the tool body transversely to the axis of the cable between a cutting position and a non-cutting position, the planar cutting blade having a cutting edge lying in a plane substantially perpendicular to the axis of the cable for making a cut through the outer conductor to near an inner conductor of the cable in a second cutting plane perpendicular to the axis of the cable, the second cutting plane being offset from the first cutting plane.

2. The coaxial cable stripping tool according to claim 1 further including a movable blade cassette, the planar cutting blade being mounted on the movable blade cassette and the blade cassette moving perpendicular to the axis of the cable from a non-cutting position to a cutting position.

3. The coaxial cable stripping tool according to claim 2 wherein the tool body includes a notch for receiving the blade cassette, the notch having opposed parallel sides and the blade cassette including opposed face surfaces sliding between the opposed parallel sides of the notch.

4. The coaxial cable stripping tool according to claim 2 further including a guide mechanism for guiding the blade cassette during movement from the non-cutting position to the cutting position.

5. The coaxial cable stripping tool according to claim 4 wherein the guide mechanism includes at least one guide rod mounted to the blade cassette and the tool body includes a corresponding guide bore receiving the guide rod.

6. The coaxial cable stripping tool according to claim 4 wherein the guide mechanism includes a pair of guide rods mounted to the tool body and the blade cassette includes a corresponding pair of guide bores receiving the guide rods.

7. The coaxial cable stripping tool according to claim 2 further including at least one spring connected between the tool body and the blade cassette to urge the blade cassette towards the non-cutting position.

8. The coaxial cable stripping tool according to claim 2 further including a positioning member connected to the cassette and extending through the tool body to an opposite side of the tool body from the cassette, the positioning member being operable from the opposite side of the tool body to move the cassette into the non-cutting position.

9. The coaxial cable stripping tool according to claim 8 wherein the positioning member comprises a barrel bolt having an enlarged head, the enlarged head acting as a stop to stop motion of the blade cassette at the non-cutting position.

10. The coaxial cable stripping tool according to claim 8 wherein the positioning member acts as a stop to limit axial motion of the coaxial cable during cutting by the double-edged blade.

11. The coaxial cable stripping tool according to claim 2 further including a spring detent mechanism to position the blade cassette in the cutting position and accurately hold the blade cassette in the cutting position as the tool is rotated to make a cut with the planar blade in the coaxial cable.

12. The coaxial cable stripping tool according to claim 11 wherein the detent mechanism comprises a spring and ball detent mechanism cooperating with a detent notch.

13. The coaxial cable stripping tool according to claim 12 further including a positioning member connected to the cassette and extending through the tool body to an opposite side of the tool body from the cassette, the positioning member having the detent notch formed therein.

14. The coaxial cable stripping tool according to claim 2 wherein the blade cassette and the planar blade form an integral replaceable unit.

15. The coaxial cable stripping tool according to claim 14 wherein the blade cassette is formed of a molded plastic and the planar blade is trapped and held in the desired position relative to the blade cassette by the molded plastic.

16. The coaxial cable stripping tool according to claim 1 wherein:

the tool body includes first and second opposed ends having corresponding first and second opposed openings for receiving the coaxial cable;

the planar blade is mounted in operable position relative to the first end of the tool body and extends into the first opening when the planar blade is in the cutting position;

the double-edged cutting blade is mounted in operable position relative to the second end of the tool body and extends into the second opening; and the planar blade makes a stripping cut when the tool is rotated while the coaxial cable is inserted into the first opening and the double-edged cutting blade makes a stripping cut when the tool is rotated while the coaxial cable is inserted into the second opening.

17. The coaxial cable stripping tool according to claim 16 wherein the first and second openings are coaxially aligned relative to each other.

18. The coaxial cable stripping tool according to claim 1 wherein:

the tool body includes first and second opposed ends, the first end having a first opening therein;

the planar blade is mounted in operable position relative to the first end of the tool body and extends into the first opening when the planar blade is in the cutting position;

the double-edged cutting blade is also mounted in operable position relative to the first end of the tool body and extends into the first opening; and the double-edged cutting blade makes a stripping cut when the tool is rotated as the coaxial cable is inserted into the first opening and the planar blade makes a stripping cut while the coaxial cable remains inserted in the first opening as the tool is rotated.

19. The coaxial cable stripping tool according to claim 18 wherein the double-edged cutting blade is mounted on an opposite side of the tool body from the planar blade.

20. The coaxial cable stripping tool according to claim 18 wherein an additional cable preparation mechanism is mounted on the second end of the tool body.

* * * * *